May 14, 1940.    J. R. SONNEBORN ET AL    2,200,971
SYSTEM FOR MAKING, FILLING, AND SEALING CONTAINERS
Filed March 4, 1939    5 Sheets-Sheet 1
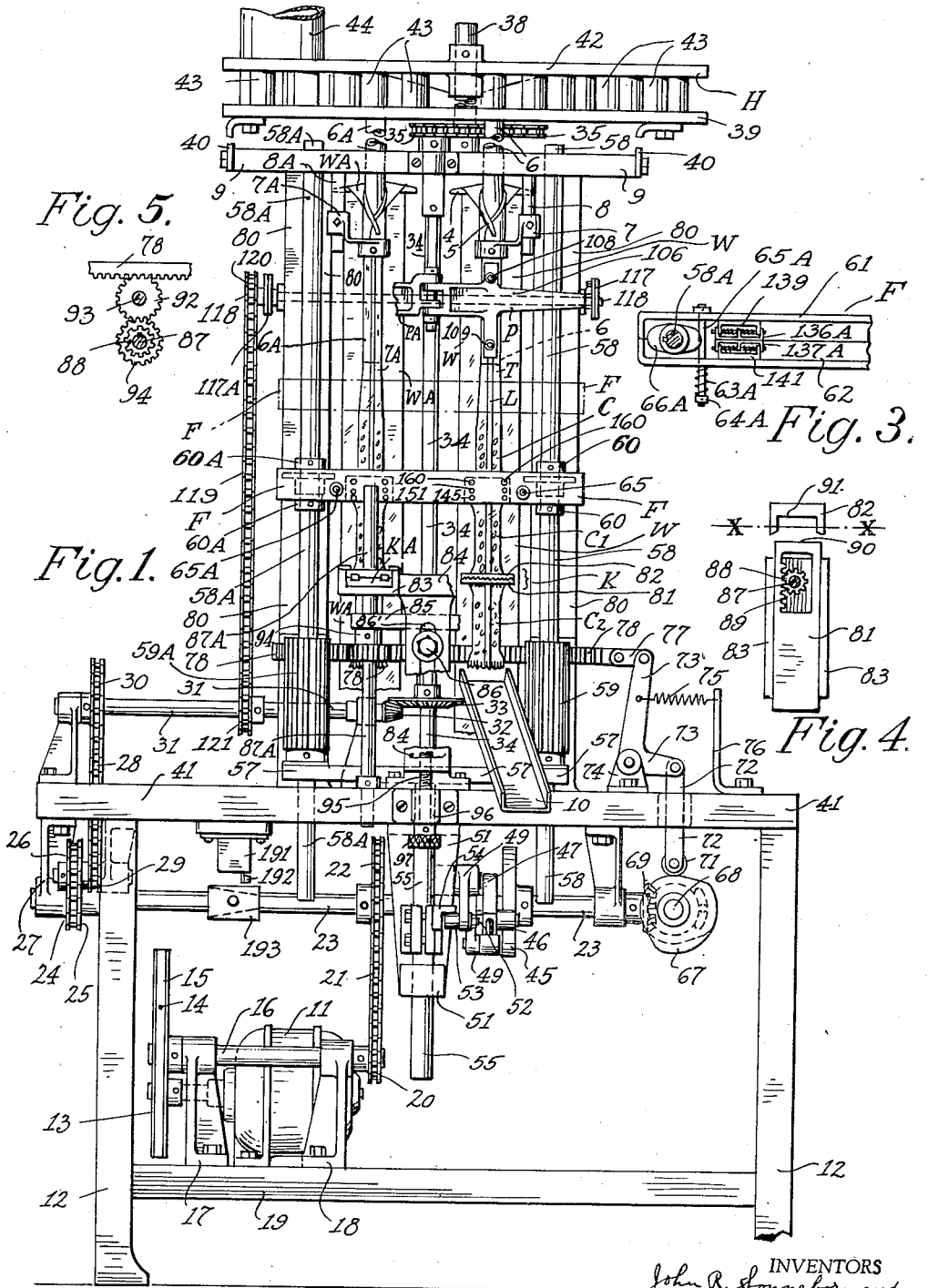
INVENTORS
John R. Sonneborn and
Jonathan M. Albertson
BY
Cornelius D. Ehret
ATTORNEY.

May 14, 1940.  J. R. SONNEBORN ET AL  2,200,971
SYSTEM FOR MAKING, FILLING, AND SEALING CONTAINERS
Filed March 4, 1939  5 Sheets-Sheet 2
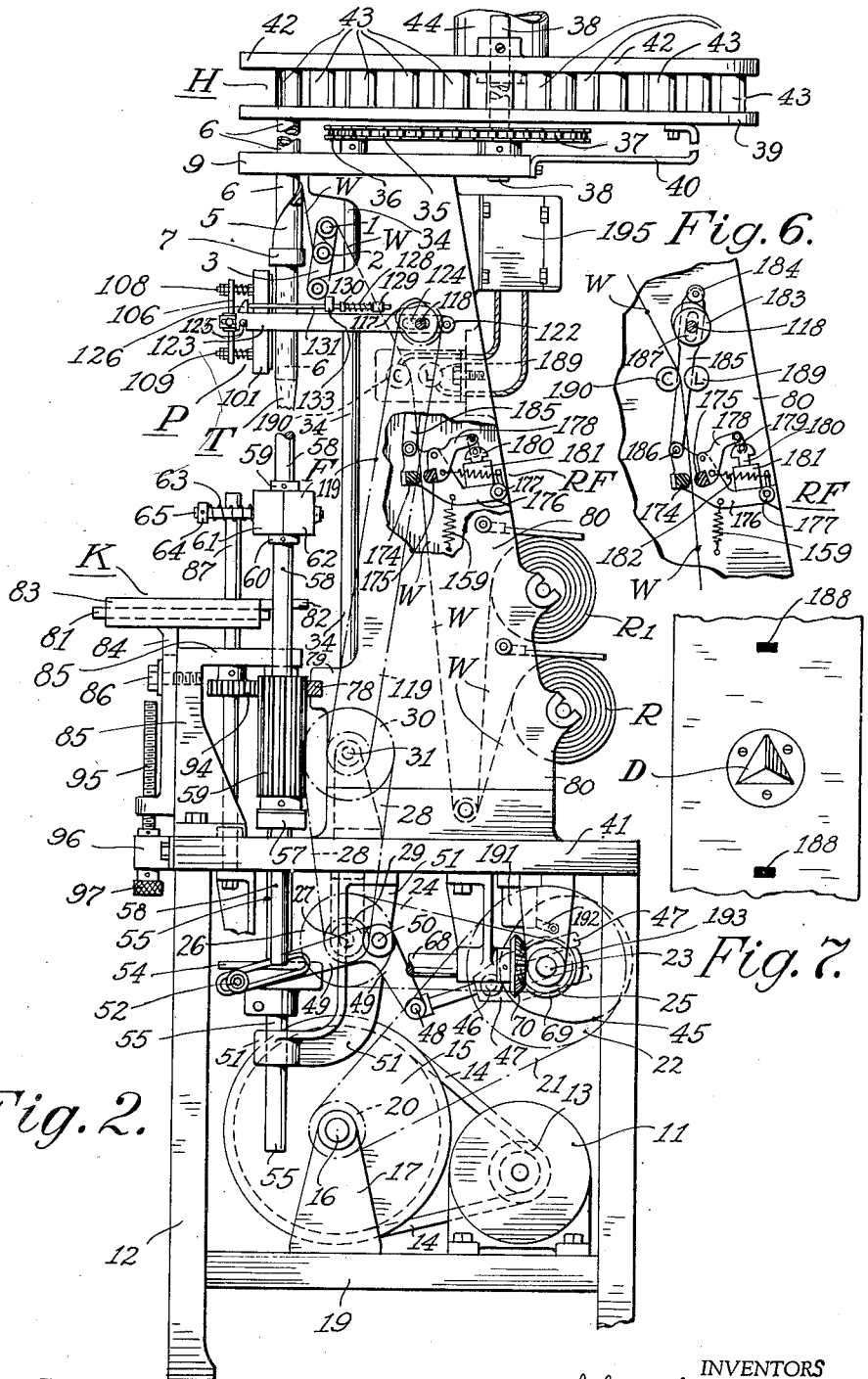
INVENTORS
John R. Sonneborn and
Jonathan Y. Albertson
Cornelius D. Ehret
ATTORNEY.

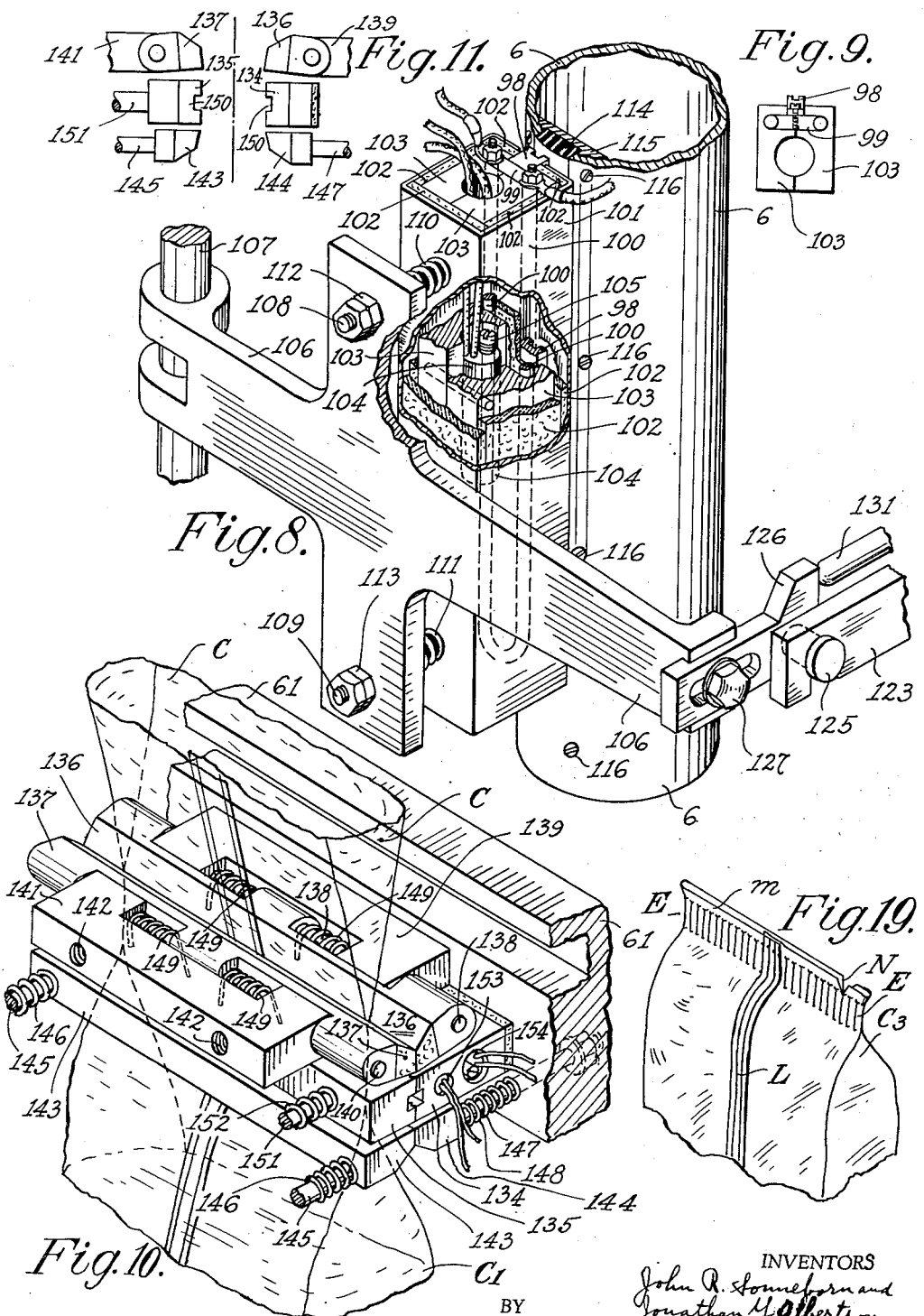

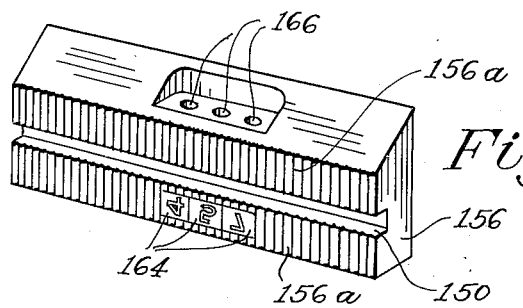
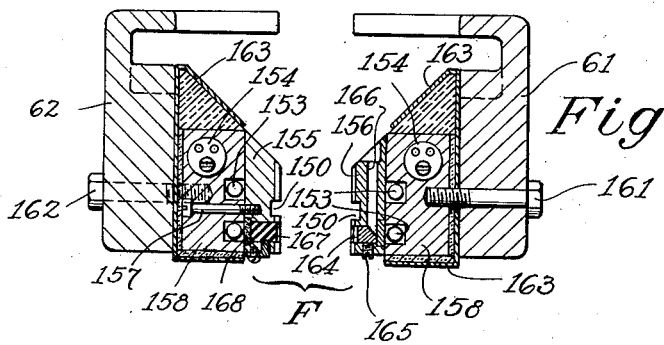
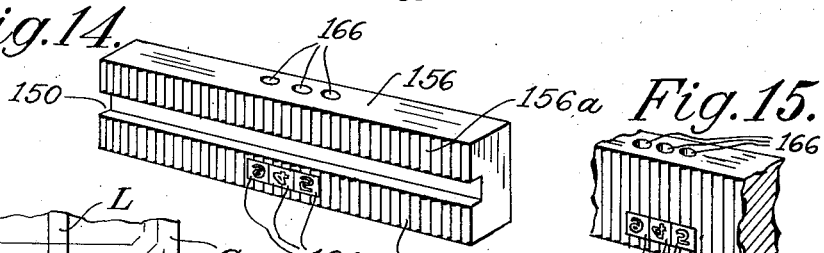
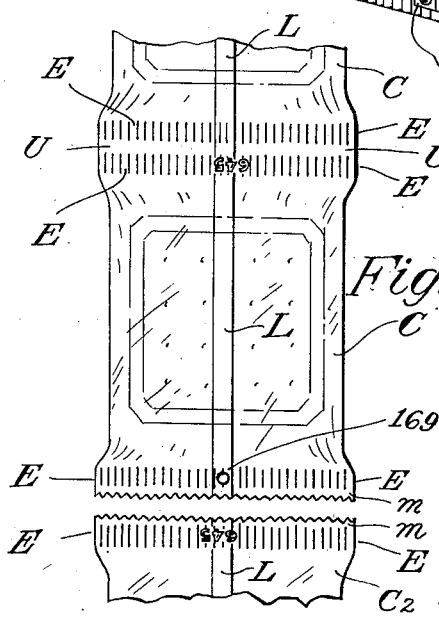
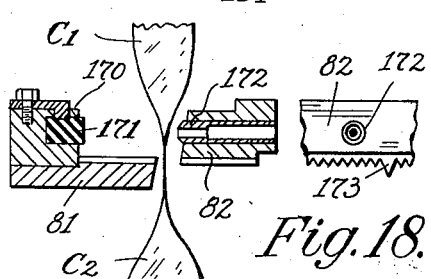
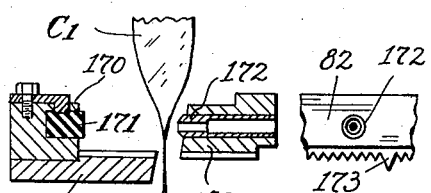

Patented May 14, 1940

2,200,971

UNITED STATES PATENT OFFICE 2,200,971

SYSTEM FOR MAKING, FILLING, AND SEALING CONTAINERS

John R. Sonneborn, Willow Grove, and Jonathan Y. Albertson, Philadelphia, Pa., assignors to Stokes and Smith Company, Summerdale, Pa., a corporation of Pennsylvania Application March 4, 1939, Serial No. 259,748

58 Claims. (Cl. 93—3)

Our invention relates to systems for making, filling and sealing containers of sheet material, particularly thermoplastic web material such as Pliofilm, moistureproof Cellophane, and the like.

In accordance with one aspect of our invention, while making a tubular or equivalent container the overlapping longitudinal margins of the web material are joined by heat and pressure applied while the web material is not under tension or is at rest, to insure uniformity and permanence of the resultant seal throughout its length.

Further in accordance with our invention, while the web material is being pulled over a form to shape it into a tube, heat and pressure are applied to form a seal transversely of a previously formed tube while the latter is, preferably at least locally, substantially free of tension; more particularly, the heated material of the transverse seal is relieved of feeding tension by limiting application of the feeding tension to the tube or web material to a region between the transverse seal and aforesaid form; and/or, additionally, the transverse seal, at least within the period of its formation, preferably is relieved of the tension due to the weight of the previously formed and filled container closed by and otherwise depending from aforesaid transverse seal.

Our invention further resides in the methods and features of combination, construction and arrangement, hereinafter described and claimed.

For an understanding of our invention, reference is to be had to the accompanying drawings, in which:

Fig. 1 is a front elevational view, with parts broken away, of a machine for making, filling and sealing containers;

Fig. 2 is a side elevational view, with parts broken away, of the machine of Fig. 1;

Fig. 3 is a fragmentary plan view of web-gripping and seal-forming mechanism shown in Figs. 1 and 2;

Fig. 4 is a plan view of web-severing mechanism shown in Figs. 1 and 2;

Fig. 5 is a detail view, in plan, of parts of the driving mechanism for the web-severing device of Fig. 4;

Figure 20:
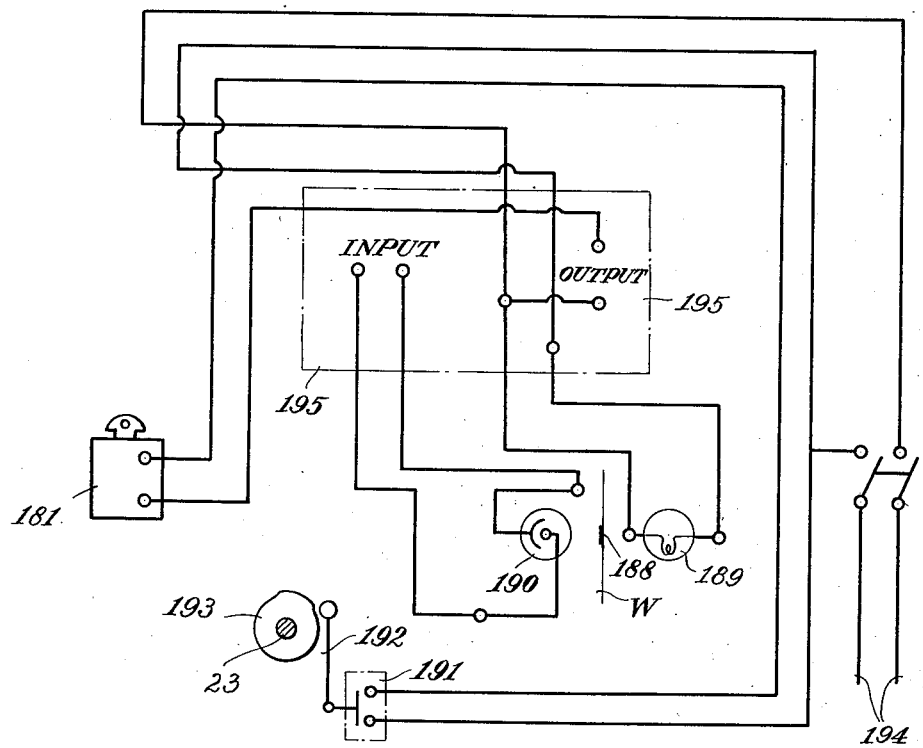

Fig. 6, on enlarged scale, illustrates a web-registering mechanism shown in Fig. 2;

Fig. 7 is a face view of web material;

Fig. 8, in perspective, and with parts broken away, shows, on enlarged scale, seal-forming mechanism of the apparatus of Figs. 1 and 2;

Fig. 9 is a plan view of parts appearing in Fig. 8;

Fig. 10, in perspective and on enlarged scale, shows details of transverse seal-forming mechanism of Figs. 1 and 2;

Fig. 11 is an end elevational view illustrative of the relation between web-gripping elements appearing in Fig. 10;

Fig. 12 is a sectional view and modification of the seal-forming mechanism shown in Fig. 10;

Fig. 13 is a perspective view of one of the sealing elements of Fig. 12;

Fig. 14, in perspective, illustrates a modification of the sealing element of Fig. 13;

Fig. 15, in perspective, shows a fragmentary view of a further modification of the sealing element of Fig. 13;

Fig. 16 is a front view of packages sealed by the elements of Figs. 12 to 14;

Fig. 17 is a sectional view in end elevation of mechanism for severing and punching the package seals;

Fig. 18 is a fragmentary front elevational view of one of the web-severing elements of Fig. 17;

Fig. 19, in perspective, shows one end of a filled package made by the mechanism of preceding figures;

Fig. 20 is a wiring diagram of the elements of a web-registering system.

Referring to Figs. 1 and 2, illustrative of our method of and a machine for making, filling and sealing containers, which machine is generally similar to that shown in Zwoyer U. S. Patent #1,986,422; web material W is fed from one or more rolls R, R1 over idler rolls 1, 2, carried by arm 3 biased as by a spring, not shown, to maintain suitable tension on the web, and is shaped into tubular form by the tools 4 and 5, of construction more fully disclosed in aforesaid Zwoyer patent, about the hollow tube or forming member 6 supported by bracket 7 adjustably secured to the rod 8 depending from the upper frame member 9 of the machine.

The overlapping margins of the web W are joined by a longitudinal seal-forming device P whose construction and action are hereinafter more fully explained, thus to form a closed tube T of web material with a seal L longitudinally thereof. Below the lower open end of the form 6, the tube T of web material is flattened by the jaws of a vertically reciprocating tube-closing or package-forming mechanism F, of construction hereinafter more fully explained. Closure of the jaws of the device F produces a seal E transversely of the tube, concurrently to form the bottom of a container C which is filled through the form 6, and to close the upper end of a previously filled container C1.

Downward movement of the device F from the position indicated in broken lines, Fig. 1, pulls further web material over the form 6 to form a further section or increment of tubing T and to bring the longitudinal margins of further web material adjacent the sealing device P; at the end of the downward movement of the mechanism F, the transverse seal E previously formed between two filled containers C1, C2 is brought into the path of movement of the blades of a web-severing device K, whose mechanism is hereinafter more fully described, which operates substantially concurrently with release of the web material by the mechanism F to cut through the seal between the containers C1, C2 and so detach filled container C2 from the web material. The detached container slides from the machine along the chute 10.

The particular machine shown is a dual unit; while the aforesaid cycle of operations are being performed upon web material W, the same sequence of operations is being performed by similar mechanism upon the web WA; because the mechanism for operating upon web WA is essentially a duplicate of that described for operating upon web W, its components are identified by the same reference characters plus the letter A.

The web-feeding and web-severing mechanisms are driven by motor 11 supported by the frame 12 of the machine; the pulley 13 on the motor shaft is connected, as by belt 14, to the pulley 15 on one end of a shaft 16 supported by brackets 17, 18 attached to the frame member 19 of the machine; to the other end of shaft 16 is attached a sprocket 20 which, through chain 21, drives a sprocket 22 on the main control shaft 23 of the machine.

The feeding head or turret H which segregates measured amounts of filling material for delivery into the forming tubes 6, 6A, is driven from shaft 23 through the chain 24 which connects sprockets 25 and 26 on shaft 23 and jackshaft 27, chain 28 which connects sprocket 29 on shaft 27 with sprocket 30 on shaft 31, bevel gear 32 on shaft 31, bevel gear 33 on shaft 34, and chain 35 connecting the sprocket 36 on the upper end of shaft 34 below the feeding head H to the sprocket 37 on shaft 38 of feeding head H. The particular feeding head shown, which may be replaced by others for different characters of filling for the containers, comprises a stationary plate 39 suitably held as by the brackets 40 to the frame member 9 of the machine, and is provided with openings in registry with or receiving the upper ends of the web-shaping tubes 6, 6A. The plate 42 of the head, which is attached to shaft 38, serves as a support for the open-ended measuring tubes 43 received by or in registry with openings through the plate 42, and also serves to prevent escape of material from the hopper 44 except as provided by the openings through the plate 42 into the measuring tubes 43.

The movement of the turret or feeding head H is preferably so timed that material is discharged through the forms 6, 6A into the tubes T, T1 of web material substantially at the end of each feeding stroke of the package-forming and web-feeding devices F, FA.

Reciprocation of the web-feeding device F is controlled by the cam 45 attached to the main shaft 23 of the machine; the periphery of cam 45 is engaged by the cam follower or roll 46 extending from the member 47 having a forked end embracing the shaft 23 and pivotally connected at 48 to one arm of a bell-crank lever 49 pivotally mounted at 50 upon the bracket 51 depending from the frame member 41 of the machine. The other arm of bell-crank lever 49 is slotted for adjustment of the supporting pin 52 of the roller 53 which engages the under surface of the ledge member 54 adjustably secured to the plunger 55 guided at its lower end by the bracket 51 secured to the under side of aforesaid frame member 41 and passing through the frame member 41 for connection to the crossmember 57 through which passes the shafts 58, 58A to which are secured, respectively, the elongated gears 59, 59A whose lower ends serve to receive the thrust of member 57 and transmit it to the shafts 58, 58A. The collars 60, 60 on shaft 58, and collars 60A, 60A on shaft 58A, serve to support the opposite ends of the package-forming mechanism F and permit rotation of the shafts 58, 58A for the purpose hereinafter described.

As the cam 45 rotates, once for each cycle of the machine, the bell-crank lever 49 is oscillated to effect reciprocation of the member 57 to and from its lowermost position, shown in full lines in Figs. 1 and 2, and consequently the package-forming mechanism F, supported by the member 57 through the intermediary of shafts 58, 58A and gears 59, 59A, moves between its limits indicated by the full and broken line positions, Fig. 1.

The length of the stroke or extent of vertical reciprocation of the package-forming mechanism F may be varied to obtain containers of different lengths by adjustment of supporting pin 52 of the roll 53 in the slotted end of the bellcrank lever 49.

The package-forming structure F comprises two members 61, 62 which are biased toward or into engagement with each other by the springs 63, 63A; as more clearly appears in Fig. 3, the spring 63A is compressed between the member 62 and a collar 64A on a bar or pin 65A which passes freely through the member 62, near the left end thereof, and is attached to the member 61 at the corresponding end. The right-hand ends of the members 61, 62, Fig. 2, are similarly biased toward each other by spring 63.

The cam 66A, suitably attached to shaft 58A between the members 61 and 62, is adapted, upon rotation of shaft 58A, to separate the left ends of members 61, 62, and concurrently a similar cam 66 (not shown) on shaft 58 separates the other ends of the members 61 and 62, to extent sufficient to permit the web-engaging elements hereinafter described to clear the containers when the package-forming structure F is moved upwardly to the dotted line position of Fig. 1.

The movements of the members 61, 62 toward and away from each other by rotation of the shafts 58, 58A is controlled by the cam 67 on shaft 68 driven from the main shaft 23 through the gears 69 and 70. The cam follower 71, which continuously engages the periphery of the cam 67, is supported at the lower end of a bar 72, guided by a slot in the frame member 41, and pivotally connected at its upper end to one arm of a bell-crank lever 73 pivotally mounted upon bracket 74 and biased to the position shown in Fig. 1 by the spring 75 extending from bracket 76. The other arm of bell-crank lever 73 is connected by link 77 to a rack 78, received by guides 79 in the vertical frame members 80 of the machine, and continuously in mesh with the gears 59, 59A throughout their reciprocation with the plunger 55.

The cam 67 is preferably adjustable, as indicated in Fig. 1, to permit variation in the timing of movements of the members 61, 62.

The same cam 67 is utilized to control operation of the web-severing mechanisms K, KA which are identical in construction, such as more fully disclosed in aforesaid Zowyer patent. Briefly, the web-severing device K comprises two blades 81, 82 guided during their concurrent movements in opposite directions by the frame member 83, attached to or forming an integral part of the support 84 adjustably clamped to the bracket 85 by bolt 86 which extends through a slot 86' in the support. Each of the blades 81, 82 is provided with a rack for operation by a gear on shaft 87; specifically, as shown in Fig. 4, the gear 88 on shaft 87 is in mesh with rack 89 of blade 81, so that oscillation of shaft 87 causes the cutting edge 90 of the blade 81 to move toward and away from the cutting line x—x; similarly, a rack (not shown) on the other side of the center of shaft 87 provides for movement of the cutting edge 91 of blade 82 toward and away from the cutting line x—x; consequently, for rotation of shaft 87 in one direction, the cutting edges 90, 91 of blades 81, 82 move toward each other to detach a filled container, and for rotation of shaft 87 in opposite direction, the blades move away from each other to clear the filled container next to be detached.

Movement of the shaft 87, and of the similar shaft 87A which controls the corresponding knives 81A, 82A of the cutting head KA, is produced by reciprocation of the rack 78. As shown in Fig. 5, rack 78 is in mesh with a gear 92 on the shaft 93 supported between bracket 85 and frame member 41, Fig. 2; and gear 92, in turn, is in mesh with gear 94 on shaft 87; by a similar arrangement, rack 78 is operatively connected to shaft 87A. The gears within the cutting heads K, KA are slidably keyed to the shafts 87, 87A to maintain continuous driving connections between the shafts and the knives as the heads K, KA are adjusted to the desired vertical position. Preferably as shown in Fig. 2, the support 84 for the heads K, KA threadably engages a screw 95, which passes through a bracket 96 secured to the front of the machine, and is provided with a suitable operating knob 97.

As thus far described, the operation of the mechanism is similar to that of aforesaid Zwoyer patent to which reference is made for further details of description.

In the machine of aforesaid Zwoyer patent, the overlapping margins of the web material are joined to form a seal longitudinally of a tube of web material by heated transverse wire elements on the periphery of a disc mounted for rotation by the frictional engagement between the wire elements and the web margins. When the web is of Pliofilm, or like material, particularly when a rubber derivative, the seal so formed is not satisfactory for many purposes because not uniform, because the heated wire elements form a surface comprising in effect ridges spaced by depressions, and the heating of the web material is correspondingly greater at localized transverse regions separated by regions which have been subjected to lesser heat and/or pressure.

With the aforesaid prior arrangement, the time of engagement between any particular increment of the seal and the heated wire element which produces it is very brief, and while that increment is soft due to the heat applied, it is subjected to and distorts because of the feeding tension applied to the web.

Our improved arrangement for joining the web margins is most clearly shown in Fig. 8, and the operating mechanism therefor is most clearly shown in Fig. 2. The hot sealing member which engages the overlapping web margins is an elongated platen or strip 98, of metal or other good conductor of heat, whose web-engaging surface is, at least longitudinally of the seal, uniform or smooth, in the sense it is devoid of aforesaid ridges and depressions, so effects uniform application of heat and pressure to the web margins to effect a seal wholly continuous and uniform throughout. The strip 98 is integral with or suitably attached to a metal bar or plate 99 which, in the particular arrangement shown, has edges grooved (Fig. 9) snugly to receive electrical heater element 100 which may be of any suitable construction, such as a coil of heater wire wrapped about a core and disposed within a suitable casing of electrical insulation. The casing 101 of the heater unit is preferably lined with sheets 102 of asbestos or other heat-insulating substance. To provide the heat storage capacity necessary for stabilizing of the temperature of the sealing element 98 which, as hereinafter appears, is intermittently used to perform sealing operations, there are provided relatively massive metal blocks 103 preferably in direct contact with the metal bar 99 and insulated from the housing 101 by aforesaid strips 102 of heat-insulating material.

The thermostatic device 104, which is adjustable as by screw 105 to maintain a desired temperature of sealing element 98, is disposed within a well formed by recesses in and subjected to the temperature of the metal blocks 103. Thermostatic device 104 may be of any known type or construction, and may be used in any known manner to control the electrical energy supplied to the heater 100; for example, the contacts of the thermostat may be electrically in series with heater 100.

Preferably, the sealing unit P is yieldingly mounted upon a supporting frame 106 pivotally mounted upon bar 107 extending vertically and downwardly from the frame member 9 of the machine; in the particular construction shown, the resilient mounting is afforded by studs 108, 109 which pass loosely through the frame 106 into the housing 101 which is biased away from the frame by the springs 110, 111 encircling the studs. The nuts or equivalent stops 112, 113 on the studs limit the movement of the housing 101 by the biasing springs.

Movement of the frame 106 in counterclockwise direction toward the form 6, Fig. 8, effects engagement of the heated sealing member 98 with the overlapping margins of the web material, and continued movement of the member 106 increases the pressure exerted by the heated sealing member 98 on the margins.

Preferably the margins are not pressed directly against the tube 6; instead, there is provided an insert 114 of suitable yielding material, for example "Neoprene", a synthetic rubber, suited to maintain its properties at the heat-sealing temperatures involved. The yielding strip 114 is backed by the metal bar 115 secured, as by screws 116, within the forming tube 6.

To effect engagement of the sealing member 98 with the web margins while the web material is free of tension, or at rest between web-feeding movements, and to move the heated element 98 from contact with the web material suitably before the beginning of the next web-feeding movement, there is provided a cam 117, Fig. 2, secured to shaft 118 driven from shaft 31 by chain 119 which drives sprocket 120 on shaft 118 and is driven by sprocket 121 on shaft 31. In the particular arrangement shown, the cam 118 makes one revolution per cycle of the machine. The periphery of the cam 117 is engaged by cam follower 122 on link 123 which is supported in horizontal position by engagement with shaft 118 which passes through a slot 124 in the link. To facilitate disconnection of the swinging frame 106 from the link 123 for access to the heater unit, or for any other reason, the latter is provided with a slotted end which hooks over a pin 125 which may be directly carried by the support 106 or, as shown in Fig. 8, may be carried by the element 126 adjustably attached as by bolt 127 to the support 106. The spring 128 for effecting movement of the sealing element 98 away from the forming tube 6 is compressed between the stationary stop 129 and a collar 130 or equivalent on the rod 131 which passes through the stop 129 and the guide 133 attached to the frame member 88. The forward end of the rod 131 continuously bears against aforesaid element 126 attached to arm 106 and maintains engagement of cam follower 122 with cam 117.

By adjustment of the member 126, there is predetermined the limits of movement of the arm 106 and therefore the duration of contact, in each cycle of the machine, of the sealing element 98 with the overlapping seam-forming margins; this adjustment also affects the degree of pressure applied by the sealing element 98 to the seam margins, although an independent adjustment of the pressure may be effected by variation of the compression of the springs 110, 111.

The construction shown in Fig. 8, therefore, permits adjustment of the temperature and pressure applied by the sealing element 98 to the overlapping margins, and also of the duration of engagement of the sealing member 98 with the margins; consequently, there can be chosen those concurrent conditions of time, temperature and pressure which afford optimum sealing results for particular compositions and thicknesses of web materials.

The arrangement shown in Fig. 8 is particularly suited for operation upon Pliofilm and other derivatives of rubber, or like materials, because that type of material, while softened by heat or during formation of the seal, stretches or otherwise deforms, yielding a non-uniform or non-homogeneous or misshapen, and sometimes discolored seal, unless during formation of the seal its components are free of stress or web-feeding tension. Our said arrangement, however, is not limited to use on aforesaid materials, derivatives of rubber, or materials similar thereto in the sense they stretch or otherwise deform when under tension while heated; but is satisfactory also for other thermoplastics such as moisture-proof Cellophane, Diafane, Sylphwrap and other materials thermoplastic because impregnated with, coated with, or consisting of thermoplastic material.

It is to be understood the device PA for joining the overlapping margins of the web WA, Fig. 1, is of similar construction and is similarly operated. Corresponding elements are identified by the same reference characters with addition of the letter A.

In the machine of aforesaid Zwoyer patent, the transverse seals dividing the tube of web material into separate containers are formed by heated gripper jaws (carried by elements similar to present members 61, 62, of the package-forming structure F) which serve also to apply feeding tension to pull further web material over the forming tube 6. Particularly with Pliofilm and like materials which readily stretch or deform when heated, this mode of feeding the web material results in stretching of the heated web material at and adjacent the seal, so weakening it that accidental breakage at or adjacent the seal is often responsible for loss of the container contents; stretching of the material also affects the feeding of the web and causes dissimilarity of appearance of recurrent web designs on the completed containers.

With our improved arrangement shown in Fig. 10, the transverse seal E, during its formation by the heated sealing member 134 coacting with relatively cold anvil 135, is relieved of web-feeding tension by auxiliary web-clamping members 136, 137, Figs. 10 and 11, carried, respectively, by the members 61, 62 of the package-forming structure F. Preferably the members 136, 137 are pivotally mounted, are biased by spring 149 to swing away from the web upon retraction of members 61, 62 from the web material, and have web-engaging faces which are downwardly inclined toward the web. When the members 61, 62 move toward each other, under the control of cam or cams 66, 66A, as above described, the members 136, 137 flatten the tube T; when their lower edges meet sufficient resistance by opposing each other through the webbing, the members 136, 137 for their further approach swing downwardly about their respective pivots firmly to clamp the web and also to produce a slight amount of slack in the web below the gripper members 136, 137 and above the heat-sealing tools 134, 135. During feed of the web material, by downward movement of structure F, it is therefore locally relieved of feeding tension at the transverse seal; the feeding tension is applied by the unheated members 136, 137 which clamp the web material above the transverse seal and below the form 6.

As shown in Fig. 10, the gripper jaw 136 is supported by pin 138 which passes through the legs of a U-shaped block 139 attached to the inner face of the member 61; similarly, the gripper jaw 137 is pivotally mounted upon pin 140 which passes through a U-shaped block 141 attached to the member 62 by bolts 160 which screw into the holes 142, 142.

To relieve the material of the seal, while heated for seal-formation, from tension due to the weight of a filled container otherwise suspended directly from it, there is provided another pair of gripper elements 143, 144, Figs. 10 and 11, supported respectively by the frame members 61, 62 of the package-forming structure F. The gripper member 143 is supported suitably below the heat-sealing elements 134, 135 by the pins 145, 145 which extend loosely through the supporting member 62. The springs 146 are compressed between the members 143 and 62 to bias the former toward the web material. The auxiliary gripper member 144 is similarly mounted upon a pair of pins 147 which pass through the frame member 61 of the structure F and is biased toward engagement with the tube T of web material by springs 148.

The provision of both sets of auxiliary grippers 136, 137 and 143, 144 insures the heat seal is, during its formation, entirely free of tension and so insures uniformity and strength of the seals.

Although particularly suited for web materials such as Pliofilm, and the like, which deform when pulled while heated, the same composite web-gripping arrangement may be used without modification for other thermoplastic web materials such as Cellophane, Diafane and the like. A similar arrangement of heat-sealing elements, and auxiliary grippers for relieving the seal of tension, forms seals transversely of the web WA; the web-feeding grippers 136A, 137A appear in Fig. 3.

Particularly for Pliofilm and like derivatives of rubber and the like, it is desirable the face of each of the seal-forming elements 134, 135 be divided as by a longitudinal notch 150 so that, instead of a single wide seal, there are formed two seals E, E joined by an unsealed transverse section U, Fig. 16; the unsealed section U is so located that the cutting head K in detaching a filled container from the web material cuts through the unsealed section. As a result, at least one end of each filled package, Fig. 19, has beyond its end seal E a narrow unsealed margin m to facilitate opening of the package. When Pliofilm containers in particular are sealed to the edge, attempts to open the container at the seal often result in rupture of the container at some other point, with loss of at least some of its contents or filling.

One of the seal-forming members 134 may be rigidly attached to its support 61, and the other seal-forming member 135 may be yieldingly mounted to its support 62, as by pins 151 and springs 152. In the particular arrangement shown, Fig. 10, the element 134 is provided with an elongated bore or cavity to receive an electric heater 153; for control of the temperature of the heater there may be provided a thermostatic switch 154 disposed within a well in the sealing tool 134.

In the modification of the package-forming and web-feeding structure F shown in Fig. 12, the metal elements 155, 156 which engage the web to form the transverse seal when the members 61, 62 are moved toward engagement with each other are detachably held, as by screws 157, to the metal blocks 158, 158 whose adjacent faces are each grooved to receive an electric heater element or elements 153 whose temperature is preferably controlled by a thermostatic switch 154 responsive to the temperature of block 158. The blocks 158, 158 are in turn held to the members 61, 62 by bolts 161, 162.

During formation of a seal, the web material forming the body of the container is protected from the heated seal-forming elements 155, 156 by the guard members 163, 163 which may be of thin sheet metal bent substantially as shown in Fig. 12. The space between each of the members 158 and its associated guard 163 is preferably filled with a suitable heat-insulating material, such as asbestos or the like.

To mark the containers concurrently with formation of a seal, one of the sealing elements, for example 156, is recessed to receive the insert or inserts 164, preferably of metal whose web-engaging face or faces is or are provided with markings such as letters, numerals, or other characters, to be impressed in the seal concurrently with its formation. The inserts 164 are held in place by set screws 165, and may be removed from the sealing element 156 by inserting a tool or punch, with a wedge-shaped end, through the openings 166 which extend downwardly from the upper face of the block 156 adjacent the rear of the inserts 164.

Preferably the element 167, carried by the other sealing element 155 for coaction with the inserts 164, is of resilient or yielding heat-withstanding material, such as Neoprene, and is protected from excessive heating by a backing 168 of asbestos or the like. By this arrangement, concurrently with formation of a seal forming one or the other end of a package, a suitable identifying mark or characteristic is impressed in the seal.

The inserts 164, 167 are so located that the markings to be individual to a package are not divided by the knives 81, 82 when they cut through the tube T of web material to detach a filled container; in the types of sealing elements shown in Figs. 12, 13 and 14, the inserts 164 are so located that the markings impressed thereby appear entirely in the lower of the two seals E, E, Fig. 16, concurrently formed when the members 61, 62 move toward each other. When the sealing elements are not provided with grooves 150, Fig. 15, they form a single wide seal, which is subsequently divided by the knives 81, 82; but again the inserts 164 are so positioned the markings impressed thereby ultimately appear entirely within one or the other of the two end seals of a package.

As indicated in Figs. 16 and 19, either or both of the transverse seals E, E may be corrugated; the corrugations may be effected by the indicated corrugations of the faces 156a of members 156, Figs. 13 and 14.

When it is desired to suspend the packages or filled containers from hooks for display purposes, the eyes 169, Fig. 16, individual to the containers for so suspending them, may be formed concurrently with separation of a filled container from the web material by the blades 81, 82. To the upper face of the lower blade 81 is attached a block 170, Fig. 17, having an insert or facing 171 of yielding material such as rubber; and to the corresponding face of the upper blade 82 is attached a punch or die member 172. When the blades 81, 82 move toward each other to detach a container, the members 171, 172 cooperate to form a hole or eye 169, Fig. 16, in the bottom seal E of a container next to be severed from the web.

The coacting faces of the knives 81, 82, Figs. 17 and 18, are preferably complementarily serrated so that the closed ends of the containers are not straight but correspondingly serrated, Fig. 16; preferably one or the other of the blades, for example blade 82, may have a tooth 173, Fig. 18, somewhat longer than the others, to be received by a correspondingly deeper notch in the other blade 81, to form, as appears in Fig. 19, a notch N which preferably extends to slight extent into the seal E. The container may be opened by pulling the edge on opposite sides of the notch N, the notch with certainty insuring tearing of the seal at the corner of the container for pouring out of its contents.

In many cases, the containers are made from web material printed or otherwise marked with recurrent decorations or printing generically termed "designs" and exemplified by the star D in Fig. 7; for various reasons, including the effects of ambient atmosphere upon the web material, irregularities in printing, or for other reasons, the lengths of webbing pulled by the successive reciprocations of the plunger 55 may not exactly correspond with the spacings between the recurrent designs, with the result there is cumulative error which at least ultimately causes marked dissimilarity in appearance of the designs on the packages. This is prevented by a reverse feed mechanism RF operative upon the web material while it is free of engagement by the grippers of the package-forming mechanism F and while free of engagement by the longitudinal seal-forming device P.

Referring to Figs. 2 and 6, the web W passes between the gripper elements 174, 175; the former is affixed to the arm 176 pivotally mounted at 177 to the frame member 80 of the machine, and the latter is carried by the member 178 pivotally mounted upon the arm 176 and connected by link 179 to the armature 180 of a solenoid 181 mounted upon the arm 176. The spring 182 biases the gripper member 175 away from engagement with the web.

The oscillations of the member 176 of the registering mechanism are effected by cam 183 on shaft 118; the cam follower or roller 184 which continuously engages the periphery of cam 183 is carried by link 185 pivotally connected at 186 to the rocker arm 176 and having intermediate its end a slot 187 through which shaft 118 passes. For each rotation of shaft 118, the arm 176 moves toward and from the position shown in Fig. 6 to which it is biased by spring 159. At the beginning of the downward stroke of the arm 176, the solenoid 181 is energized, as hereinafter explained, to move the gripper member 175 to clamp the web against the cooperating gripper member 174 so that by the continued downward movement of member 176 the web W is pulled or fed in a reverse direction until a control element 188 on the web, which may be an opaque spot, interrupts the path of light from the lamp 189 to the photo-electric cell 190 or equivalent light-sensitive device. The interruption of the light causes de-energization of the solenoid, whereupon the spring 182 is effective to move the gripper element 175 away from the web for the remainder of the downward or counterclockwise movement of the arm 176.

Energization of the solenoid while the web is being advanced by the package-forming mechanism F or while its margins are being joined by the sealing device P, is prevented by the switch 191 whose operating lever 192 is controlled by cam 193 on the main shaft 23, Fig. 1. As appears in Fig. 20, the contacts of switch 191 are in series with the solenoid 181 to prevent energization of the solenoid so long as switch 191 is open, regardless of interruption of the path of light from lamp 189 to the photo-cell 190. The amplifier 195 in whose input and output circuits are respectively included the photo-cell 190 and solenoid 181 may be of conventional type employing one or more thermionic amplifier tubes.

With this arrangement, aforesaid accumulation of error is prevented; in each cycle of the machine, the webbing is re-registered at an aligning station exemplified by the photo-cell 190 and lamp 189. Although such alignment may or does not precisely determine the position of the decorative matter or design upon the package formed in that or any subsequent cycle of the machine, nevertheless it does prevent accumulation of error which would cause marked dissimilarities in appearance of the packages.

Because of the hereinbefore described elimination of stretching of the web material during its forward feeding movements, the registrations of the web, afforded by mechanism RF when the web is free of tension, i. e., free of engagement by either or both of the longitudinal and transverse seal-forming means, are effective, regardless of whether the web is Pliofilm, Cellophane, or any other thermoplastic material, to obtain the desired position of the designs on the filled or completed containers.

What we claim is:

1. In the art of making containers of web material, the method which comprises applying tension to the web material to draw it over a form to produce a tube, relieving the tension upon the web material, and while said material is relieved of tension joining its margins to each other to form a seal extending longitudinally of said tube.

2. In the art of making containers of thermoplastic web material, the method which comprises applying tension to the web material to draw it over a form to produce a tube, relieving the tension upon the web material, and applying heat and pressure to the margins of said web material while it is relieved of tension to avoid distortion of the seal formed by joinder of said margins.

3. In the art of making containers of web material, the method which comprises intermittently applying tension to the web material to draw it over a form to produce successive tubular elements, and joining the margins of each such element in an interval between applications of tension to said web material.

4. In the art of making containers of web material, the method which comprises applying tension to the web material to draw it over a form to produce a tube, during drawing of the web material relieving it locally of tension, and transversely sealing the tube so formed in a region relieved of tension.

5. In the art of making containers of thermoplastic web material, the method which comprises applying tension to the web material to draw it over a form to produce a tube, relieving said web material locally of tension, and transversely sealing the tube by application of heat and pressure to flatten it in a region relieved of tension.

6. In the art of making containers from thermoplastic web material, the method which comprises intermittently pulling the web material over a form to shape it into a tube with the web margins overlapping, and between successive pulls upon the web material applying heat and pressure to join said margins.

7. In the art of making containers from thermoplastic web material, the method which comprises pulling the web material over a form to shape it into a tube, and concurrently with pulling of the web material applying heat and pressure to form a seal transversely of a previously formed section of the tube which is free of tension.

8. In the art of making containers from thermoplastic web material, the method which comprises intermittently pulling the web material over a form to shape it into a tube with the longitudinal web margins in overlapping relation, between successive pulls upon the web material applying heat and pressure to said margins to seal the tube, and concurrently with aforesaid pulling of the web material applying heat and pressure to form a seal transversely of a previously formed section of the tube which is free of tension.

9. In the art of making, filling and sealing containers of thermoplastic web material, the method which comprises applying heat and pressure transversely of a tube of said material concurrently to form two transverse seals joined by an unsealed section, and severing the tube through the unsealed section to leave an unsealed margin along those edges of said seals which define the extremities of the containers.

10. In the art of making and sealing containers of thermoplastic web material, the method which comprises applying heat and pressure transversely of a tube of said material to form a seal closing an end of an unfilled container, severing the web material to detach a previously filled container, and concurrently forming an eye in said seal.

11. In the art of making and sealing containers of thermoplastic web material, the method which comprises applying heat and pressure transversely of a tube of said material both to form seals closing adjacent ends of successively formed containers and concurrently to mark one of said seals, severing the web material between the containers, and concurrently forming an eye in the other of said seals.

12. In the art of making, filling and sealing containers of thermoplastic web material, the method which comprises applying heat and pressure transversely of a tube of said material to form a seal closing a filled container and to form a second seal closing an end of the tube, and severing the tube through the unsealed section of the tube between the seals to detach the filled container.

13. In the art of making, filling and sealing containers of thermoplastic web material, the method which comprises applying heat and pressure transversely of a tube of said material to form a seal closing a filled container and to form a second seal closing an end of the tube, severing the tube between the seals to detach the filled container and to provide an unsealed margin for said first-named seal, and concurrently notching said margin of the web material beyond said first-named seal.

14. Mechanism for joining the margins of thermoplastic web material comprising means for effecting overlap of said margins to form tubing, heated structure, mechanism effecting intermittent engagement of said structure with the overlapping margins to effect their thermoplastic attachment to each other and so form a seam longitudinally of said tubing, and mechanism for advancing the web material, after an engagement thereof by said heated structure, longitudinally of said tubing to extent less than the length of the margins thermoplastically joined during said engagement.

15. Mechanism comprising means for advancing, step by step, a web having its margins overlapping to form tubing, structure for pressing said margins into attachment with each other having an extent, in the direction of advance of the web, greater than the length of web fed per step, and mechanism for moving said structure into and out of engagement with the overlapping margins between successive forward movements of the web.

16. Mechanism comprising means for intermittently feeding thermoplastic web material having its margins overlapping to form tubing, heated structure for effecting attachment of said margins to each other, and means for effecting movement of said heated structure to engage the web material while at rest progressively to form a continuous seal longitudinally of said tubing and for maintaining said structure out of engagement with said web material during feeding thereof to avoid distortion of the seal.

17. Mechanism for making tubing from thermoplastic web material comprising a forming member for shaping the web material into a tube with the web margins overlapping, heated structure intermittently movable toward said member to effect attachment of said margins to each other incrementally to form a continuous seal longitudinally of the tube, and mechanism for intermittently feeding the web material along said tube-forming member while disengaged from said structure to avoid distortion of the seal.

18. Mechanism for making tubing from thermoplastic web material comprising a forming member about which the web material is shaped into a tube whose margins overlap, heated structure intermittently movable toward said member to press said margins into engagement with each other and concurrently to soften them, means effective between pressing movements of said structure to pull the tubing beyond said member and to pull further web material into position for engagement of its margins by said structure.

19. Mechanism comprising means for intermittently feeding thermoplastic web material having with its margins overlapping, pivotally mounted heated structure for pressing said margins into engagement with each other and concurrently softening them, and means for swinging said structure into and out of engagement with said margins between feeding movements of the web material positioning successive lengths of the margins thereof for engagement by said heated structure.

20. A machine for operating upon thermoplastic web material comprising feeding means effective during a part of each cycle of said machine to feed the web material with its margins overlapping, heated structure effective during another part of the cycle of said machine to press the margins into engagement with each other and concurrently soften them, and means adjustable to predetermine in said cycle the duration of engagement of said structure with said margins.

21. A machine for operating upon thermoplastic web material comprising feeding means effective during a part of each cycle of said machine to feed the web material with its margins overlapping, heated structure effective during another part of the cycle of said machine to press the margins into engagement with each other and concurrently soften them, control means for maintaining a predetermined temperature of said heated structure, and means adjustable to predetermine the duration of engagement of said heated structure with said margins.

22. A machine for operating upon thermoplastic web material comprising feeding means effective during a part of each cycle of said machine to feed the web material with its margins overlapping, heated structure effective during another part of the cycle of said machine to press the margins into engagement with each other and concurrently soften them, and means adjustable to predetermine the pressure applied to said margins by said heated structure.

23. A machine for operating upon thermoplastic web material comprising feeding means effective during a part of each cycle of said machine to feed the web material with its margins overlapping, heated structure effective during another part of the cycle of said machine to press the margins into engagement with each other and concurrently soften them, and means adjustable to predetermine the temperature of said heated structure and the pressure applied thereby to said margins.

24. A machine for operating upon thermoplastic web material comprising feeding means effective during a part of each cycle of said machine to feed the web material with its margins overlapping, heated structure effective during another part of the cycle of said machine to press the margins into engagement with each other and concurrently soften them, and means adjustable to predetermine the temperature of said heated structure, the pressure applied thereby to said margins, and the duration of application of said pressure.

25. Mechanism for joining the margins of web material comprising means for effecting overlap of said margins, structure movable toward and from said web material, a member for pressing said margins into attachment with each other resiliently mounted upon said structure, and means for operating said structure adjustable to shift the limits of its movement and so vary the pressure applied by said member to the web margins.

26. Mechanism for making tubing from thermoplastic web material comprising a forming member for shaping the web material into a tube with its margins overlapping, and means for applying heat and pressure to said margins to effect their attachment to each other comprising a movably mounted housing, a margin-pressing tool supported by and extending from said housing, a thermostat within said housing for controlling the temperature of said tool, and mechanism for moving said housing toward and away from said forming member.

27. Mechanism for joining the margins of thermoplastic web material comprising means for effecting overlap of the margins, heated structure, reciprocating means, including a disengageable mechanical connection for intermittently moving said heated structure into engagement with the margins, and biasing means for moving said structure away from the web material during alternate strokes of said reciprocating means and upon breaking of said connection.

28. Mechanism for making tubing from thermoplastic web material comprising a rigid forming member having an insert of elastic material substantially unaffected by heat, means for shaping the web material about said member with its margins overlying said insert and overlapping each other, and heated structure for intermittently pressing the overlapping margins against said insert and concurrently softening them.

29. Mechanism for making tubing from thermoplastic web material comprising a rigid forming member having an insert of "Neoprene", means for shaping the material about said member with its margins overlying said insert and overlapping each other, and heated structure for pressing the overlapping margins against said insert and concurrently softening them.

30. Mechanism for making, filling and sealing containers of thermoplastic web material comprising a hollow forming member through which the containers are filled and about which the web material is shaped with its margins overlapping to form a tube, means for transversely flattening and sealing the tube at intervals to form containers comprising reciprocating structure which intermittently draws further web about said forming member, and means for pressing and heating said margins to seal the tube longitudinally thereof comprising heated structure movable toward and away from said forming member between successive web-drawing movements of said reciprocating structure.

31. Mechanism for sealing thermoplastic web material comprising members for applying heat and pressure to the web material to form a seal, and means for relieving the seal during its formation from tension comprising structure engaging the web material at a distance from the seal.

32. Mechanism for feeding and sealing thermoplastic web material comprising movable structure, means for applying heat and pressure to the web material to form a seal including relatively movable web-engaging members carried by said movable structure, and web-feeding members carried by said movable structure and spaced from said first-named members to relieve the heated web material of the seal from feeding tension.

33. Mechanism for feeding and sealing thermoplastic web material comprising reciprocating structure, means for applying heat and pressure to the web material to form a seal including relatively movable members carried by said movable structure for clamping the web material during the web-feeding stroke of said structure, and relatively movable members carried by said structure for clamping the web material at a distance from the seal during the web-feeding stroke of said structure.

34. Mechanism for sealing filled containers, formed from a tube of thermoplastic web material, comprising relatively movable members for flattening the tube and applying heat and pressure to the web material to form a seal closing a filled container, and relatively movable members for sustaining the weight of a filled container during formation of its seal by said first-named members.

35. Mechanism for making, filling and sealing containers of thermoplastic web material comprising a hollow forming element through which the containers are filled and about which the web material is shaped to form a tube, structure movable toward and away from said element, relatively movable members carried by said structure for flattening the tube and applying heat and pressure to form a transverse seal closing a filled container, web-feeding members carried by said structure for clamping the tube of web material between said forming member and said first-named movable members, and mechanism effecting engagement of the tube of web material by said first and second-named members for removing said structure from said tube-forming element.

36. Mechanism for making, filling and sealing containers of thermoplastic web material comprising a hollow forming element through which the containers are filled and about which the web material is shaped to form a tube, structure movable toward and away from said element, relatively movable members carried by said structure for flattening the tube and applying heat and pressure to form a transverse seal closing a filled container, relatively movable members for clamping the tube at a region between the seal and the filling in the container to relieve the heated web material of the seal from the weight of the filled container, and mechanism effecting engagement of the tube of web material by said first and second-named members for movement of said structure from said tube-forming element.

37. Mechanism for transversely sealing and feeding a tube of thermoplastic web material comprising reciprocating structure, relatively movable sealing members carried by said structure for clamping the tube and softening the web material to form a seal, mechanism effecting clamping of the tube by said members for the feeding stroke of said structure, and means for relieving the heated seal from feeding stresses.

38. Mechanism for transversely sealing and feeding a tube of thermoplastic web material comprising reciprocating structure, relatively movable sealing members carried by said structure for clamping the tube and softening the web material to form a seal, mechanism effecting clamping of the tube by said members for the feeding stroke of said structure, and means for clamping the tube on opposite sides of the seal during its formation to relieve it from stress.

39. In a machine of the character described, a gripper having relatively movable jaws at least one of which is provided with a heated element coactive with the other jaw to apply heat and pressure to thermoplastic web material between them, and auxiliary elements respectively movable with said jaws and coactive with each other to relieve the heated web material while engaged by said heat-sealing elements from stresses imposed on the web material.

40. In a machine of the character described, a gripper whose relatively movable jaws comprise a pair of heat-sealing elements for applying heat and pressure to thermoplastic web material between them, and a pair of pivotally mounted elements for clamping the web material at a distance from said heat-sealing elements and for producing slack in the web material between said pairs of elements.

41. In a machine of the character described, a gripper whose relatively movable jaws comprise a pair of heat-sealing elements for applying heat and pressure to thermoplastic web material between them, and two pairs of resiliently mounted elements for clamping the web material on opposite sides of said heat-sealing elements and for providing slack in the web material between said heat-sealing elements and said resiliently mounted elements.

42. In a machine for making, filling and sealing containers of thermoplastic web material, members for transversely flattening and heat-sealing a tube of said material to form two seals connected by an unsealed section, and means for severing the tube through said unsealed section to detach a filled, sealed container.

43. In a machine for making, filling and sealing containers of thermoplastic web material, members for transversely flattening and heat-sealing a tube of said material to form two seals connected by an unsealed section, and means for severing the tube through said unsealed section to detach a filled, sealed container and means for notching the unsealed material at the end of the container to facilitate subsequent tearing of the seal for removal of the filling.

44. In a machine for sealing containers of thermoplastic web material, members for transversely flattening and heat-sealing a tube of said material to form a seal closing an end of a container, an element of yielding material carried by one of said sealing members, and a die element of rigid material carried by the other of said sealing members and coacting with said yielding element during the formation of a seal by said members to mark the seal.

45. In a machine for sealing containers of thermoplastic web material, a gripper comprising heated members movable to apply pressure and heat to form a seal closing an end of a container, and guard elements attached to said members for preventing contact therewith of the body of the container.

46. In a machine for sealing containers of thermoplastic web material, a gripper comprising heated members movable to apply pressure and heat to form a seal closing an end of an unfilled container, and guard elements attached to said heated members to hold the body of the container during filling from contact with said heated members.

47. In a machine for making, filling and sealing containers of thermoplastic web material, members for transversely flattening and heat-sealing a tube of said material to form two transverse seals connected by an unsealed section, elements associated with said members and coacting with each other during the formation of said seals to mark one of said seals, and means for severing the tube through said unsealed section and forming a hole through the other of said seals.

48. Shearing members relatively movable to cut across and divide a seal of web material joining containers formed of said material, and coacting elements carried by said shearing members respectively for forming a hole through the seal concurrently with division thereof by said members.

49. Shearing members relatively movable to cut across and divide a seal of web material joining containers formed of said material, an element of yielding material carried by one of said shearing members, and a die element carried by the other of said shearing members and coacting with said element of yielding material during division of the seal by said shearing members to punch a hole through one of the seal divisions.

50. Mechanism for joining overlapping margins of thermoplastic web material having recurrent designs thereon comprising heated structure, mechanism effecting intermittent movement of said structure to press said margins into engagement with each other and concurrently to soften them, means intermittently feeding web material with overlapping margins in the path of said heated structure, and means for preventing cumulation of variations in spacing of said designs including means for engaging and moving the web material while free of said heated structure and said feeding means.

51. Mechanism for joining overlapping margins of thermoplastic web material having recurrent designs thereon comprising heated structure, mechanism effecting intermittent movement of said structure to press said margins into engagement with each other and concurrently to soften them, intermittent means operative between successive engagements of the web margins by said heated structure to feed into the path thereof further web material with overlapping margins, and means for preventing cumulation of variations in spacing of said designs including means for engaging and moving the web material while free of said heated structure and said feeding means.

52. A machine for making, filling and sealing containers from web material having recurrent designs thereon comprising a member about which the web material is shaped to form a tube, structure movable toward and from said member, heat-sealing elements carried by said structure and engaging the tube to form a seal transversely thereof during feed of the web by said structure from said member, and means for insuring substantially similar locations of said designs between the transverse seals comprising means for relieving the web material at and adjacent the transverse seals from feeding tension during their formation, and means effective between web-feeding movements by said structure to move the web material to extent to position a design at a predetermined location.

53. In the art of making containers from a web consisting of thermoplastic material, the method which comprises applying tension to the web to draw it over a form to produce a tube, applying heat and pressure to join the edges of said web and so form a seal extending longitudinally of said tube, and reducing the tension upon the web during aforesaid application of heat.

54. In the art of making containers from a web of a rubber derivative, the method which comprises applying tension to the web to draw it over a form to produce a tube, relieving the tension upon the web, and while the tension thereon is reduced applying heat and pressure to the web to join its edges and so form a seal extending longitudinally of said tube.

55. In the art of making containers from a web consisting of thermoplastic material, the method which comprises applying tension to the web to draw it over a form to produce a tube, locally reducing the tension applied to the web, and transversely sealing the tube in a region relieved of tension.

56. In the art of making containers from a web consisting of thermoplastic material, the method which comprises intermittently applying tension to the web to pull it over a form incrementally to shape it into a tube, and applying heat and pressure to the margins of the web only while the tension is reduced to form an undistorted seal extending longitudinally of the tube.

57. In the art of making containers from a web consisting of thermoplastic material, the method which comprises intermittently applying tension to the web to pull it over a form incrementally to shape it into a tube, applying heat and pressure to the margins of the web only while the tension is reduced to form an undistorted seal extending longitudinally of the tube, during movement of the web applying heat and pressure transversely of the tube beyond said form to produce a seal transversely of said tube, and reducing the tension on the tube at and adjacent the transverse seal.

58. In the art of making containers from a web consisting of thermoplastic web material, the method which comprises applying heat and pressure transversely of a tube of said material to form a seal closing one end of one container and to form a second seal spaced from the first and closing the opposite end of another container, and shortly thereafter severing the tube across the unsealed section between said seals.

JOHN R. SONNEBORN.
JONATHAN Y. ALBERTSON.

CERTIFICATE OF CORRECTION.

Patent No. 2,200,971. May 14, 1940.

JOHN R. SONNEBORN, ET AL.

It is hereby certified that error appears in the above numbered patent requiring correction as follows: In the grant, line 3, and in the heading to the printed specification, address of assignee, after "Summerdale," insert --Philadelphia,--, as shown by the record of assignments in this office; and that the said Letters Patent should be read with this correction therein that the same may conform to the record of the case in the Patent Office.

Signed and sealed this 28th day of January, A. D. 1941.

(Seal)
Henry Van Arsdale,
Acting Commissioner of Patents.